United States Patent [19]

Boone

[11] Patent Number: 5,060,976
[45] Date of Patent: Oct. 29, 1991

[54] SEAT BELT ANCHOR STRAP TETHER ASSEMBLY

[75] Inventor: Marion C. Boone, Oak Park, Mich.

[73] Assignee: Chrysler Corporation, Highland Park, Mich.

[21] Appl. No.: 628,825

[22] Filed: Dec. 17, 1990

[51] Int. Cl.[5] ............................................. B60R 22/00
[52] U.S. Cl. ..................................... 280/801; 280/808
[58] Field of Search ............... 280/801, 808, 805, 806, 280/807; 297/481, 482, 485, 468

[56] References Cited

U.S. PATENT DOCUMENTS 3,957,304  5/1976  Koutsky et al. ...................... 297/468
4,231,592  11/1980  Scherenberg et al. .............. 280/808
4,648,625  3/1987  Lynch ................................. 280/808

FOREIGN PATENT DOCUMENTS 2610343  9/1977  Fed. Rep. of Germany ...... 297/481
2437845  6/1980  France ................................ 280/808

Primary Examiner—Kenneth R. Rice
Assistant Examiner—M. Shaughnessy
Attorney, Agent, or Firm—Edward P. Barthel

[57] ABSTRACT

A seat belt strap assembly allowing for longitudinal adjustment of a vehicle seat such that it maintains and restores an anchor strap pivotally secured to the seat fixed base. The tether assembly comprises an elastic band having each free end thereof engaged by one of a pair of identical plastic retainer clips. Each retainer clip is adapted for ready snap-in insertion in an associated one of a pair of normally opposed elongated apertures formed in the anchor strap and the seat side shield, respectively.

4 Claims, 2 Drawing Sheets

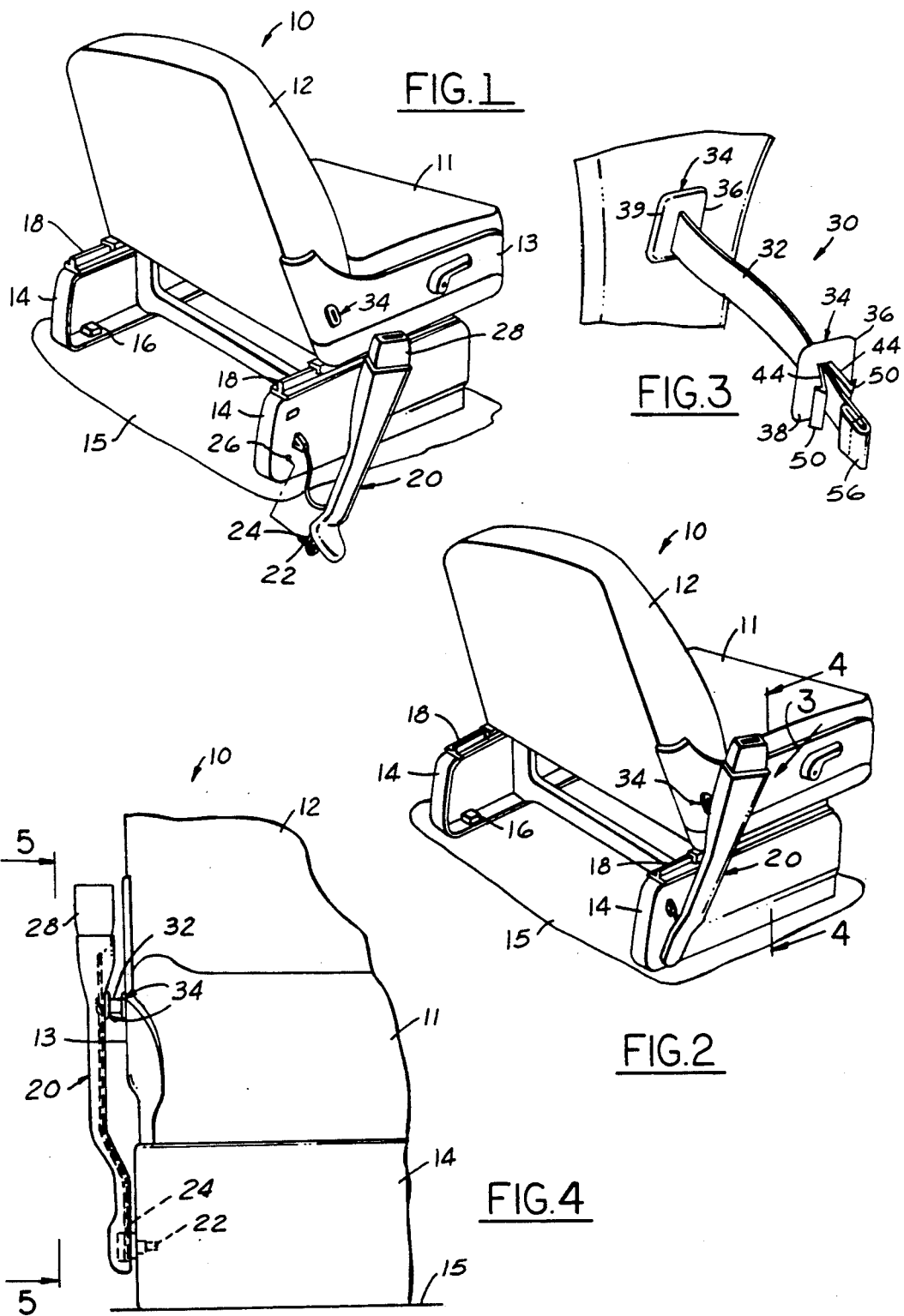

SEAT BELT ANCHOR STRAP TETHER ASSEMBLY

BACKGROUND OF THE INVENTION

This invention relates to vehicle seat belt anchorage arrangements and more particularly to a tether assembly for attaching a pivotable seat belt anchor strap to a longitudinally adjustable occupant seat of a passenger car motor vehicle.

BACKGROUND OF THE INVENTION

The U.S. Pat. No. 4,923,214 issued May 8, 1990 discusses typical seat belt anchorages which are directly mounted to the vehicle floor pan and have straps or extensions which position a seat belt buckle, latching plate, or guide loop near the occupant for convenient access. Since the anchorages are mounted to the floor pan of the vehicle along one or both of the lateral sides of the seats, when the occupant adjusts the seat in a fore-and-aft direction with the seat belt fastened, the belts tighten or loosen, depending upon the direction of adjustment. This tightening or loosening behavior is inconvenient to the user since it requires readjustment of the belt.

The present invention provides a seat belt anchor strap positioning tether assembly for a movable seat which maintains and restores the anchor strap in its normal occupant accessible position irrespective of longitudinal fore and aft movement of the seat structure. Accordingly, a seat belt anchor strap has its upper end attached to and movable with a sliding seat by means of the tether assembly of the present invention while the anchor strap has its lower end pivotally attached to a seat base adapted to be fixed to the vehicle frame. The tether assembly comprises an elastic band tether having identical plastic retainer clips attached to each end. One of the retainer clips is adapted to be readily secured in a through slot in a seat cushion trim panel while the other retainer clip is adapted to be readily secured in a through slot in the anchor strap.

BRIEF DESCRIPTION OF THE DRAWINGS

These and other features, objects, and advantages of the invention will become apparent upon consideration of the appended specification and drawings in which:

FIG. 1 is a perspective view of a motor vehicle front seat structure showing an exploded view of a seat belt anchor strap tether assembly according to the invention;

FIG. 2 is a view similar to FIG. 1 showing the seat belt anchor strap and tether assembly in their assembled state;

FIG. 3 is an enlarged fragmentary perspective view taken in the direction of arrow "3" in FIG. 2;

FIG. 4 is a fragmentary front elevational view taken substantially on the line 4—4 of FIG. 2;

DETAILED DESCRIPTION OF THE INVENTION

Figure 5:
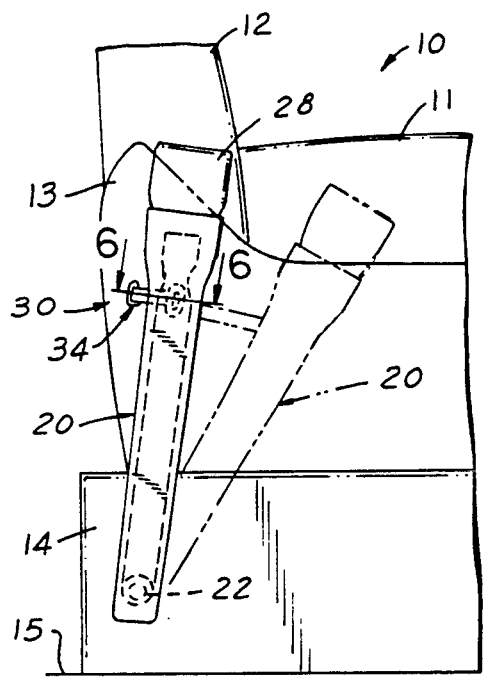
FIG. 5 is a fragmentary side elevational view taken substantially on the line 5—5 of FIG. 4.

Referring to FIG. 1 of the drawings a vehicle front seat structure 10 is shown comprising a seat cushion 11, a seat back 12, and a seat trim panel or side shield 13 to which an embodiment of the present invention is applied. The seat structure 10 includes a pair of side base supports 14 secured to the vehicle floor by bolts 16. The seat is slidably supported by a pair of longitudinally extending slide rails or tracks 18 fixed on associated base supports 14 allowing the longitudinal position of the seat to be adjusted by engaging a seat slide lock mechanism (not shown).

An elongated seat belt anchorage strap 20 is pivotally secured to one base support 14 by means of a pivot bolt 22 extending through a hole in a sheet steel inner member 24 coextensive with the strap 20 and adapted for reception in base support mounting hole 26. The anchorage strap 20 has an outer molded plastic sleeve 27 which encases the sheet steel member 24 and supports a seat belt buckle 28 at its upper free end adapted to receive a seat belt latch (not shown).

Figure 7:
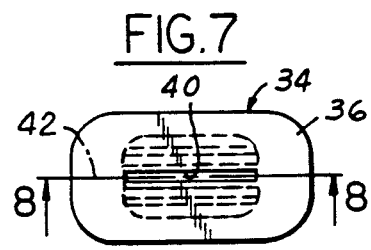
FIG. 7 is an enlarged detail front elevational view of the plastic retainer.
Figure 9:
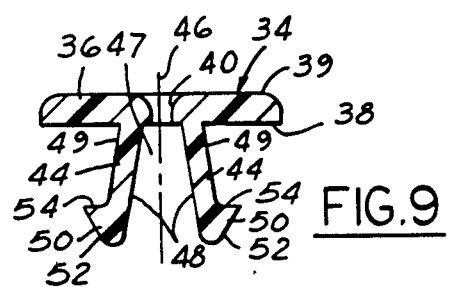
FIG. 9 is an enlarged vertical sectional view taken on the line 9—9 of FIG. 8.
Figure 8:
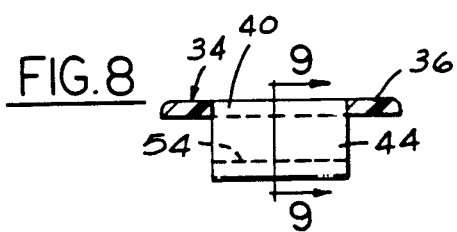
FIG. 8 is a vertical sectional view taken on the line 8—8 of FIG. 7.

As best seen in FIG. 3 a seat belt anchor strap tether assembly, generally indicated at 30, includes an elastomeric band which in the preferred embodiment is a stretchable woven fabric or cloth material elastic band 32. The elastic band 32 has identical retainer clips 34 provided adjacent each end thereof. With reference to FIGS. 7, 8, and 9 each retainer clip 34, molded from suitable flexible plastic material, comprises a rectangular planar base 36 having inner 38 and outer 39 parallel sides. The base has an elongated slot 40 formed therein aligned on base major longitudinal axis 42 and sized to slidably receive the band 32 therethrough. A pair of mirror image resilient locking wings 44, which extend longitudinally substantially coextensive with the slot 40, are arranged in opposed relationship and project from the base inner surface 38 on either side of the slot 40.

It will be noted in FIG. 9 that the pair of locking wings 44, in their free state, extend in an outwardly canted or diverging direction from base inner side 38 for positioning on either side of a longitudinally extending vertically disposed plane of symmetry, indicated by construction line 46, which plane includes the major axis 42. As a result a passage 47 is defined by the locking wings' pair of opposing inside wing surfaces 48. A pair of opposite outer wing surfaces 49 are also formed by the pair of locking wings 44.

With reference to FIGS. 3 and 9 each locking wing 44 is provided with a longitudinally extending barb 50 coextensive with its outer free end. Each of the barbs 50 has one opposite outside facet 52 which is tapered from a coextensive shoulder 54 toward its associated locking wing rounded free end. It will be seen in FIG. 9 that each shoulder 54 lies in a common plane disposed parallel to the base inner side 38 with the retainer clip in its free state.

The tether assembly 30 is fabricated by initially feeding free ends of the elastic band 32 through an associated retainer clip slot 40 such that the retainer base outer sides 39 are in opposed relation as seen in FIG. 3. Next, the free ends of the band are folded over to provide three thicknesses of material defining a raised or thickened blocking pad 56 and transversely sewn or stitched at the midpoint, as seen at 57 in FIG. 6. The pad 56 has a predetermined thickness preventing its passage through the retainer clip slot 40 thus capturing each of the retainer clips on the elastic band 32.

As viewed in FIG. 5, the anchor strap 20 is pivotally connected at its lower end to the side of a seat base 14 by bolt 22. Vertically disposed elongated aperture means comprising an elongated aperture 60, formed in outer side the plastic sleeve 27, and an aligned matching elongated aperture 62 in the sheet steel member 24 are provided to receive the pair of locking wings 44 of an associated first one of the retainer clips 34 therein. In a like manner a vertically disposed single elongated aperture 64, having a width of a predetermined dimensional size equal to that of the aligned pair of aligned apertures 60 and 62, is formed in the side shield 13 to receive the pair of locking wings 44 of an associated second one of the retainer clips 34 therein.

Figure 6A:
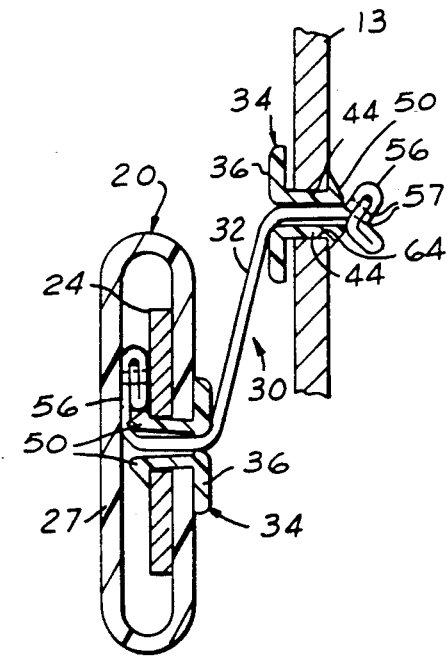
FIG. 6A is a view similar to FIG. 6 showing the tether assembly in a stretched condition.
Figure 6:
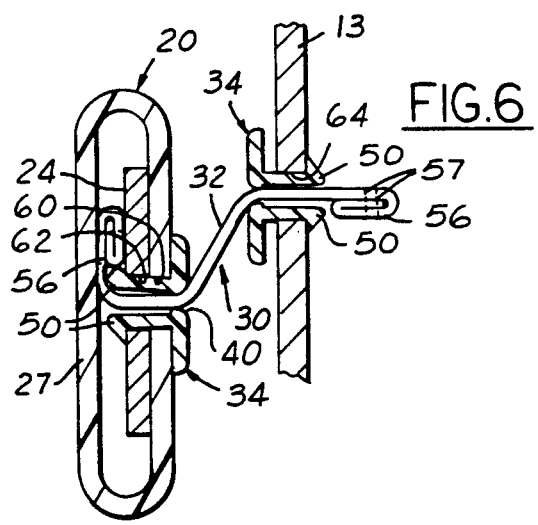
FIG. 6 is an enlarged fragmentary horizontal sectional view taken on the line 6—6 of FIG. 5.

With reference to FIG. 6 installation of the tether assembly 30 is achieved by first feeding each elastic band thickened pad portion 56 through its associated aperture, i.e. either aligned paired apertures 60 and 62 in the strap 20 or single aperture 64 in side shield 13. It will be appreciated that the paired apertures 60, 62 or the single aperture 64 have the same predetermined width dimension enabling the ready passage of their associated pads 56 therethrough. Upon each pad portion 56 being inserted through its associated aperture its respective retainer clip pair of resilient locking wings 44 are urged together from their normal diverging free state. In this way each barb outside facet 52 engages its respective aperture side edge enabling the barbs 50 to pass therethrough. It will be noted that initially during installation each of the retainer clips 34 are, in turn, slid toward the midpoint of the elastic band. This, of course, allows each thickened pan 56 to be passed through its associated aperture 60,62 or 64 prior to the insertion of the locking wings 44.

In FIG. 6A it will be observed that when the occupant adjusts the seat in a forward direction, for example, the strap 20 is pivoted about bolt 22 causing the elastic band 32 to be stretched. As a result the thickened pads 56 are drawn toward their associated clip retainer lead-in openings 47. In the case of the retainer clip 34 in the side shield aperture 64 the pad 56 is forced into a V-shaped configuration trying to move into the passage 47. This tends to spread the locking wings 44 apart and thus into tighter abutting contact with their associated aperture side edges.

In the case of the strap pair of apertures 60, 62 it will be seen that the elastic band pad 56 is trapped to one side of its associated retainer clip barb 50 by the close fit of covering sleeve 27. If, however, the pad 56 were dislodged and moved towards the entrance of passage 47 it is clear that its attempted entry into the passage 47 would again tend to spread the locking wings causing tighter contact with the side edges of the apertures 60, 62.

By virtue of applicant's unique construction each retainer clip 34 is adapted to resist a substantial tension pull on the elastic band 32 without being dislodged from its associated aperture. Thus, it will be appreciated that upon the seat being adjusted in either a fore-or-aft longitudinal manner the tether assembly elastic band 32 will stretch allowing the strap 20 freedom to pivot about bolt 22 without discomfort to the seat occupant.

Although only one embodiment of the invention has been shown and described, it will be apparent that modifications and variations will come to the mind of a person skilled in the art which modifications and variations do not fall outside the scope of the invention as defined by the following claims.

What is claimed is:

1. A seat belt anchor strap tether assembly adapted for attachment to a sheet-like member formed with an elongated aperture, the tether assembly comprising:
   a flexible elastomeric tether band having first and second ends with at least one end formed with a thickened pad having a predetermined thickness sized for ready insertion through the elongated aperture, a one-piece retainer clip molded from flexible plastic material and adapted to be attached to said tether band one end;
   said retainer clip comprising a rectangular-shaped planar base having inner and outer faces with the major axis thereof included in the retainer clip plane of symmetry thereof disposed normal to said base, an elongated slot formed in said base aligned on said major axis adapted to slidably receive said tether band therethrough, a pair of mirror image resilient longitudinally extending locking wings arranged in opposed relationship and projecting from said base inner face on opposed coextensive sides of said slot, said pair of locking wings in their free state extending in an outwardly diverging direction away from said plane of symmetry;
   said pair of locking wings defining two opposite outside wing surfaces and two opposing inside wing surfaces, each said locking wing having a longitudinally extending barb coextensive with its one outer free end formed with a shoulder extending outwardly from its associated outside wing surface, each said barb having an opposite outside facet which is tapered from its associated shoulder toward the locking wing free end thereof;
   said tether band thickened pad sized to enable ready insertion through said elongated aperture from said base inner face for location beyond the confines of said two opposing inside wing surfaces, whereby upon insertion of said pair of locking wings in the elongated aperture the edges thereof engaging respective ones of said barb facets causing said locking wings to be deflected inwardly toward each other from their normal free state permitting passage through the elongated aperture, whereupon said locking wings spring outwardly such that each said barb shoulder engages behind the elongated aperture member resisting removal of said retainer clip from the member.

2. The tether assembly as set forth in claim 1, wherein said locking wings two opposing inside wing surfaces define a passage therebetween, such that upon a pulling force being applied to said elastic band other free end said thickened pad tends to spread said locking wings apart and into increased abutting contact with the aperture side edges.

3. The tether assembly as set forth in claim 1, wherein said tether assembly has first and second free ends formed with thickened pads, and a pair of identical one-piece retainer clips adapted to be attached adjacent respective free ends of said tether band for mounting in respective first and second sheet-like members each formed with an elongated aperture, whereby each said elongated aperture is adapted to receive an associated retainer clip therein such that said tether band interconnects said sheet-like members.

4. A seat belt anchor strap tether assembly adapted for use in conjunction with a vehicle seat whose position can be adjusted fore-and-aft on a seat base fixed to a motor vehicle, a seat belt elongated anchor strap having upper and lower ends with said lower end pivotally mounted to a stationary portion of a motor vehicle, a first elongated aperture formed in an anchor strap sleeve thereof adjacent its upper free end and a second elongated aperture formed in a vehicle seat side shield thereof, the tether assembly comprising:

a flexible elastic tether band having first and second free ends with each said free end folded and secured into a thickened pad having a predetermined thickness adapted for ready insertion through an associated one of the elongated strap and seat apertures, a pair of identical one-piece retainer clips molded from flexible plastic material and adapted to be attached adjacent respective free ends of said tether band;

each said retainer clip comprising a rectangular-shaped planar base having inner and outer faces with the major axis thereof included in the retainer clip plane of symmetry thereof disposed normal to said base, an elongated slot formed in said base aligned on said major axis, a pair of mirror image resilient longitudinally extending locking wings arranged in opposed relationship projecting from said base inner face on opposed sides of said slot, said pair of locking wings in their free state extending in an outwardly diverging direction away from said plane of symmetry;

each said pair of locking wings defining two opposite outside wing surfaces and two opposing inside locking wing surfaces, each said locking wing having a longitudinally extending barb coextensive with its one outer free end formed with a coextensive shoulder extending outwardly from its associated wing outside surface, each said barb having one opposite outside facet which is tapered from its associated shoulder toward the free end thereof of its associated locking wing; and said tether band thickened pad sized for ready insertion through an associated elongated aperture from said base inner face such that each said thickened pad is located past the confines of its associated two opposing inside wing surfaces, whereby upon insertion of each said pair of locking wings in their associated elongated aperture the edges thereof engaging its associated barb facet causing said locking wings to be deflected inwardly from their normal free state position to permit insertion through their associated aperture whereupon each said pair of locking wings are adapted to spring outwardly such that their associated barb shoulders engage behind the strap sleeve and the seat side shield respectively, to resist removal of each said retainer clip from its associated aperture.

* * * * *